(12) United States Patent　　(10) Patent No.:　　US 7,765,892 B2
Li　　(45) Date of Patent:　　Aug. 3, 2010

(54) MULTI-DEGREE-OF-FREEDOM MOTION MECHANISM

(75) Inventor: Ming-Feng Li, Lujhou (TW)

(73) Assignee: Micro-Star International Co., Ltd., Jung-He, Taipei Hsien (TW)

( * ) Notice: Subject to any disclaimer, the term of this patent is extended or adjusted under 35 U.S.C. 154(b) by 0 days.

(21) Appl. No.: 12/258,502

(22) Filed: Oct. 27, 2008

(65) Prior Publication Data

US 2009/0314118 A1　Dec. 24, 2009

(30) Foreign Application Priority Data

Jun. 24, 2008　(TW) ............................... 97123594 A

(51) Int. Cl.
*B25J 17/00* (2006.01)
*G05G 9/047* (2006.01)
(52) U.S. Cl. ............................... 74/490.05; 74/471 XY
(58) Field of Classification Search .............. 74/490.05, 74/471 XY; 601/5, 23, 33, 34, 35; 623/24, 623/25, 57, 58, 59, 60, 61, 62, 63, 64, 65; 901/15, 28, 29
See application file for complete search history.

(56) References Cited

U.S. PATENT DOCUMENTS 5,036,724 A * 8/1991 Rosheim .................. 74/490.06
5,224,589 A * 7/1993 Karakama et al. ........... 200/339

* cited by examiner

*Primary Examiner*—Thomas R Hannon
*Assistant Examiner*—Phillip A Johnson

(57) ABSTRACT

A multi-degree-of-freedom motion mechanism comprises a first linkage unit, a second linkage unit, a driven unit, a connection block and a third linkage unit; the first linkage unit and the second linkage unit are respectively disposed with a first curved projecting section and a second curved projecting section; a driven rod of the driven unit is respectively movably coupled to the first curved projecting section and the second curved projecting section; the connection block is respectively pivotally coupled to a first pivot element of the driven unit and a second pivot element of a third linkage unit. Whereby, the driven unit can then be nimbly controlled to move up and down as well as left and right and rotate relatively to a geometric center point of the connection block through few drive mechanisms.

4 Claims, 2 Drawing Sheets

MULTI-DEGREE-OF-FREEDOM MOTION MECHANISM

CROSS REFERENCE TO RELATED DOCUMENT

This application claims priority to TAIWAN Patent Application No. 097123594, filed on Jun. 24, 2008.

BACKGROUND OF THE INVENTION

1. Field of the Invention

The present invention relates to a mechanical joint, and more particularly to a joint with multi-degree-of-freedom action.

2. Description of Related Art

A multi-degree-of-freedom motion mechanism may be applied to an action mechanism of a camera lens of a robot head, and may be applied to a joint mechanism such as a robot shoulder, elbow, wrist, knee or ankle, and may also be applied to an adapter connected to a searchlight, antenna, radar antenna or hub and used as a joint of a transmission box and a joint of a flying facility.

There are several patent technologies concerning a multi-degree-of-freedom action joint, for example, the joints mechanism disclosed by Taiwan Patent Publishing No. 200626320 uses a convex gear and a concave gear to constitute a spherical gear pair and forms the whole joints mechanism by operating in coordination with three degrees of freedom and cross frame assuming a fixed ratio of speed so as to be able to achieve a spatial power transmission having three degrees of freedom of swaying, oscillation and rotation concurrently. However, a structure of the aforementioned Taiwan patent application is very complex, and difficult to control the actions of the joints by few drive mechanisms. Furthermore, a dexterous split equator joint disclosed by U.S. Pat. No. 6,026,703 uses four semicircular links to drive an arm to move in a hemisphere, and an axis of the arm is passed through the center of sphere. A structure of the aforementioned US patent is also very complex and is not assembled easily, the production cost is high and the arm is not allowed to process a rotation action such that a requirement that a logic operational method concerning clipping and picking up an article through a mechanical arm obtains a unique solution cannot be satisfied and a situation of infinite sets of solutions will be generated to cause the mechanical arm not to complete the article clipping action autonomously.

SUMMARY OF THE INVENTION

For improving a conventional multi-degree-of-freedom action joint, the present invention is proposed.

The main object of the present invention is to provide a multi-degree-of-freedom motion mechanism, allowing a structure to be simple, an assembly to be easy and the production cost to be reduced.

Another object of the present invention is to provide a multi-degree-of-freedom motion mechanism, capable of nimbly controlling up-down and left-right movements and rotations of a driven unit through few drive mechanism.

Still another object of the present invention is to provide a multi-degree-of-freedom motion mechanism, capable of being conveniently coupled to other article such as robot or camera lens to allow the other article to have a nimbly controllable joint.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
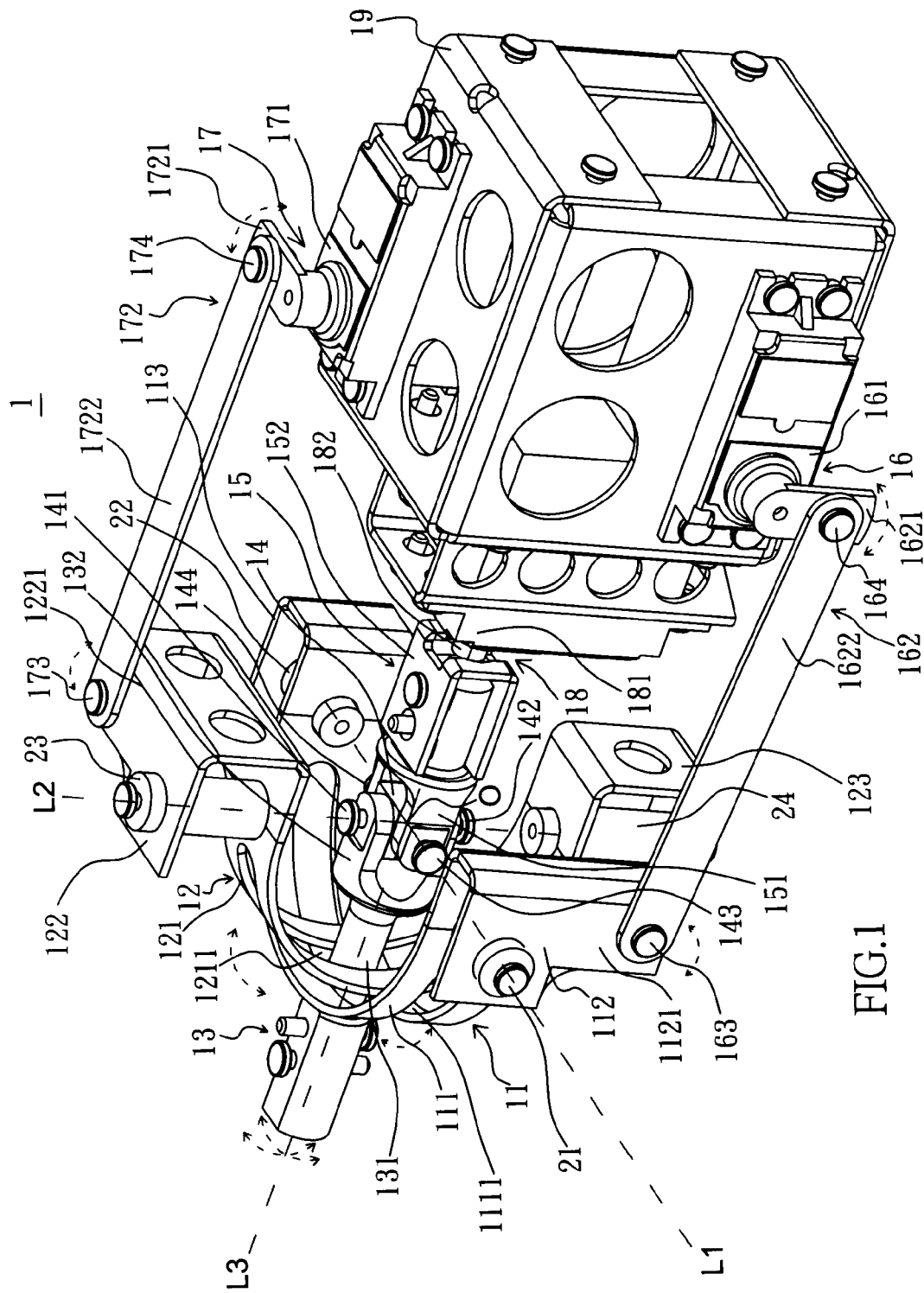
FIG. 1 is a perspective view of a multi-degree-of-freedom motion mechanism according to the present invention.
Figure 2:
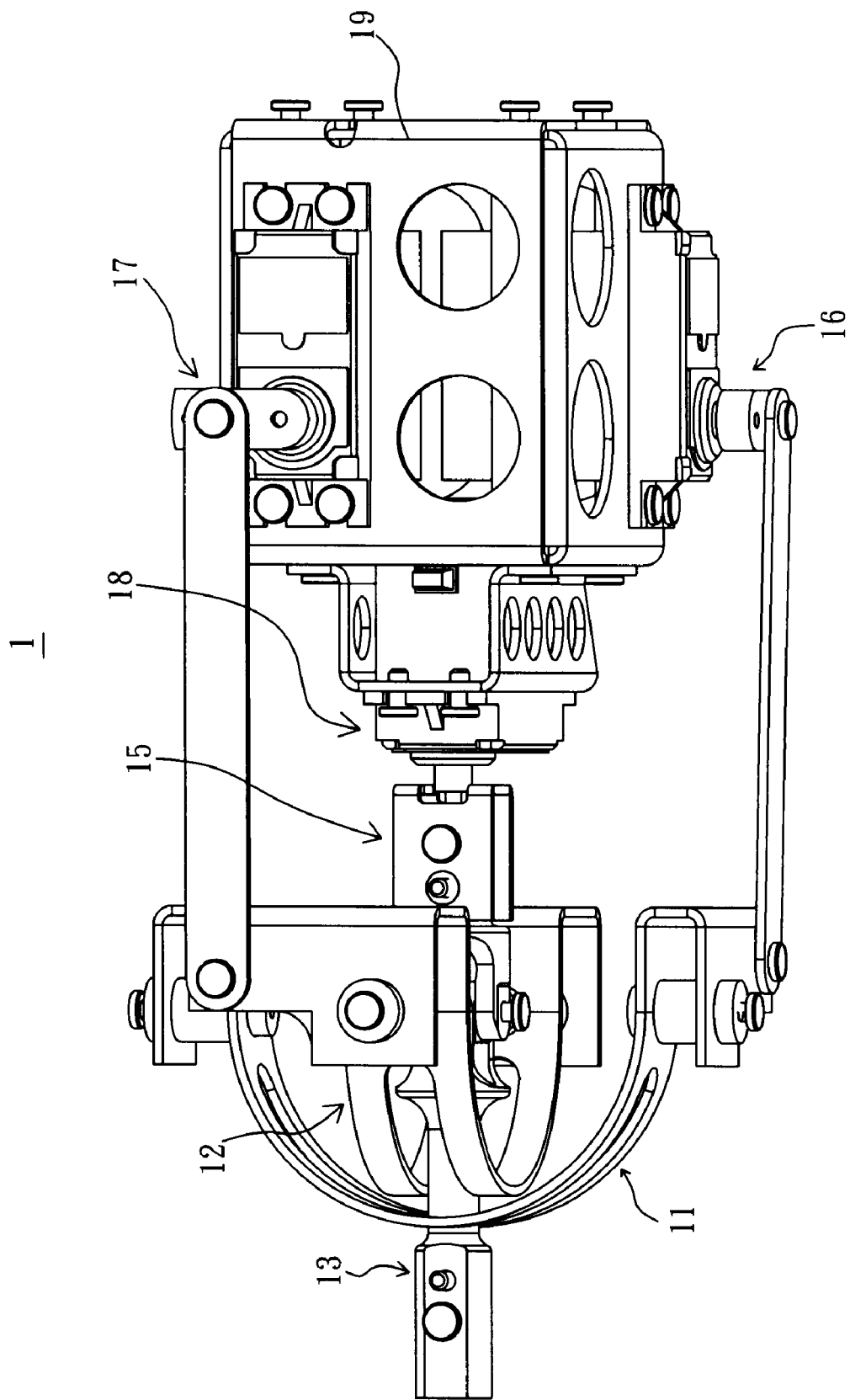
FIG. 2 is another schematic view of a multi-degree-of-freedom motion mechanism according to the present invention.

Please refer to FIGS. 1 and 2. FIGS. 1 and 2 show a multi-degree-of-freedom motion mechanism of a preferred embodiment according to the present invention. A multi-degree-of-freedom motion mechanism 1 comprises a first linkage unit 11, a second linkage unit 12, a driven unit 13, a connection block 14, a third linkage unit 15, a first drive unit 16, a second drive unit 17, a third drive unit 18 and a base 19.

The first linkage unit 11 is disposed with a first curved projecting section 111, a first pivot section 112 and a second pivot section 113; the first curved projecting section 111 assumes a semicircle type; the first curved projecting section 111 is disposed with a first rectangular hole 1111 extended along a longitudinal direction thereof; two ends of the curved projecting section 111 are respectively connected to the first pivot section 112 and the second pivot section 113; the first pivot section 112 and the second pivot section 113 respectively assume a U-shaped body with different side lengths in which one outer side is longer; the first pivot section 112 is disposed with a first arm 1121 extended toward a lateral outer side of the first curved projecting section 111; an outer side of the first pivot section 112 and an outer side of the second pivot section 113 are respectively pivotally coupled to a first fixing shaft 21 and a second fixing shaft 22; the first fixing shaft 21 and the second fixing shaft 22 have the same first axis L1; the first curved projection section 111 can be rotated relatively to the first axis L1; the first fixing shaft 21 and the second fixing shaft 22 are respectively used for fixedly coupling to other article.

The second linkage unit 12 and the first linkage unit 11 have the same shape and structure; the second linkage unit 12 is disposed with a second curved projecting section 121, a third pivot section 122 and a fourth pivot section 123; the second curved projecting section 121 assumes a semicircle shape; the second curved projecting section 121 is disposed with a second rectangular hole 1211 extended along a longitudinal direction thereof; two ends of the second curved projecting section 121 are respectively connected to the third pivot section 122 and the second pivot section 123; the third pivot section 122 and the fourth pivoting section 123 respectively assume a U-shaped body with different side lengths in which one outer side is longer; the third pivot section 122 is disposed with a second arm 1221 extended toward a lateral outer side of the second curved projecting section 121; an outer side of the third pivot section 122 and an outer side of the fourth pivot section 123 are respectively pivotally coupled to a third fixing shaft 23 and a fourth fixing shaft 24; the third fixing shaft 23 and the fourth fixing shaft 24 have the same second axis L2; the second curved projection section 121 can be rotated relatively to the second axis L2; the first axis L1 and the second axis L2 are at the same plane and perpendicular to each other; the third fixing shaft 23 and the fourth fixing shaft 24 are respectively used for fixedly coupled to other article. The second curved projecting section 121 is positioned inside the first curved projecting section 111.

The driven unit 13 is disposed with a driven rod 131 and a first pivot element 132; the driven rod 131 passes through the first rectangular hole 1111 and the second rectangular hole 1211 and extends to the inner side of the second curved projecting section 121 to couple with the first pivot element 132 such that the driven rod 131 is movable with the first curved projecting section 111 and the second curved projecting section 121; part of the driven unit 13 extends outward the first curved projecting section 111 via the two rectangular holes 1111, 1211 for coupling with the other article; the first pivot element 132 is a U-shaped body with a closed end couple to the driven rod 131 and two fork sides pivotally couple with the connection block 14; the driven rod 131 of the driven unit 13 has a third axis L3.

The connection block 14 is cubical and two opposite upper and lower end faces thereof are respectively pivotally coupled to the first pivot element 132 through two pivotal shafts 141 and 142 to allow the driven unit 13 to be moved left and right relatively to the connection block 14. A geometric center point O of the connection block 14 then is an intersection point of the first axis L1 and the second axis L2; the two pivotal shafts 141 and 142, the third fixing shaft 23 and the fourth fixing shaft 24 have the common second axis L2.

The third linkage unit 15 is disposed with a second pivot element 151 and a coupling element 152; the second pivot element 151 is a U-shaped body, and a bottom end thereof is connected to the coupling element 152; two opposite left and right end faces of the connection block 14 are respectively pivotally coupled to the second pivot element 151 through two pivotal shaft 143 and 144 to allow the connection block 14 and the driven unit 13 to be moved up and down relatively to the third linkage unit 15. Accordingly, the driven unit 13 may be moved up and down as well as left and right relatively to the third linkage unit 15, but the driven unit 13 will be rotated synchronically when the third linkage unit 15 is rotated. The two pivotal shafts 143 and 144, the first fixing shaft 21 and the second fixing shaft 22 have the common first axis L1.

The first driven unit 16 is disposed with a first power source 161 and a first transmission unit 162; the first transmission unit 162 is disposed with a first transmission arm 1621 and a first transmission rod 1622; one end of the transmission arm 1621 is connected to the first power source 161, and can be driven by the first power source 161 to allow another end thereof to be moved fore-and-aft. Two ends of the first transmission rod 1622 are respectively pivotally coupled to an outer side of the first arm 1121 and the first transmission arm 1621 respectively through two shafts 163 and 164 to allow the first pivot section 112 to be connected to the first drive unit 16 and the first transmission unit 162 to be respectively connected to the first power source 161 and the first air 1121, and further to allow the first power source 161 to drive the first arm 1121 to move through the first transmission unit 162. The first transmission rod 1622 can drive the first arm 1121 to move fore-and-aft and further drive the first curved projecting section 111 to move to allow the first curved projecting section 111 to drive the driven rod 131 of the driven unit 13 to move fore-and-aft along the second rectangular hole 1211 of the second curved projecting section 121 so that the first pivot section 112 can be driven by the first drive unit 16 to cause the first curved projecting section 111 to be rotated relatively to the first axis L1.

The second drive unit 17 is disposed with a second power source 171 and a second transmission unit 172; the second transmission unit 172 is disposed with a second transmission arm 1721 and a second transmission rod 1722; one end of the second transmission arm 1721 is connected to a second power source 171, and can be driven by the second power source 171 to cause another end thereof to be moved fore-and-aft; two ends of the second transmission rod 1722 are respectively pivotally coupled to an outer side of the second arm 1221 and the second transmission arm 1721 respectively through two shafts 173 and 174 to allow the third pivot section 122 to be connected to the second drive unit 17 and the second transmission unit 172 to be respectively connected to the second power source 171 and the second arm 1221, and further to allow the second power source 171 to drive the second arm 1221 through the second transmission unit 172. The second transmission rod 1722 can drive the second arm 1221 to move fore-and-aft to further drive the second curved projecting section 121 to move to cause the second curved projecting section 121 to drive the driven rod 131 of the driven unit 13 to move left and right along the first rectangular hole 1111 of the first curved projecting section 111 so that the third pivot section 123 is driven by the second drive unit 17 to cause the second curved projecting section 121 to be rotated relatively to the second axis L2.

The third drive unit 18 is disposed with a third power source 181 and a third transmission unit 182; the third transmission unit 182 is respectively connected to the third power source 181 and the coupling element 152 of the third linkage unit 15 to allow the coupling element 152 to be connected to the third drive unit 18. The third power source 181 can drive the third transmission unit 182 to rotate and further drive the third linkage unit 15 to rotate to allow the third linkage unit 15 to drive the connection block 14 and the driven unit 13 to rotate. Accordingly, the third drive unit 18 can drive the coupling element 152 to rotate, and further drive the connection block 14 and the first pivot element 132 to cause the driven rod 131 to be rotated relatively to the third axis L3. The third axis L3 is also passed through the center point O of the connection block 14 to allow the first axis L1, the second axis L2 and the third axis L3 to be intersected at the same center point o.

The base 19 is respectively fixedly coupled to the first power source 161 of the first drive unit 16, the second power source 171 of the second drive unit 17 and the third power source 181 of the third drive unit 18. The first power source 161, the second power source 171 and the third power source 181 may respectively be a motor.

The first drive unit 16 and the second drive unit 17 may respectively drive the first linkage unit 11 and the second linkage unit 12 to allow the first linkage unit 11 and the second linkage unit 12 to drive the driven rod 131 of the driven unit 13 to move up and down or left and right relatively to the center point o in a scope of the first rectangular hole 111 and the second rectangular hole 121 interlaced with each other, and the third axis L3 of the driven unit 13 maintains a state of pointing toward the center point O of the connection block 14. The third drive unit 18 may drive the third linkage unit 15 simultaneously to cause the third linkage unit 15 to drive the connection block 14 and the driven unit 13 to rotate, and the driven unit 13 is rotated relatively to the third axis L3.

That the first linkage unit 11 and the second linkage unit 12 are separated from the first drive unit 16 and the second drive unit 17 according to the present invention is helpful to process a flexible mechanism design; a distance between the first linkage unit 11 and the first drive unit 16 and a distance between the second linkage 12 and the second drive unit 17 may be adjusted depending on space and a gravity of center disposition of the mechanism by utilizing lengths of the first transmission rod 1622 and the second transmission rod 1722. Furthermore, utilizing a length difference between the first arm 1121 and the first transmission arm 1621 and a length difference between the second arm 1221 and the second transmission arm 1721 achieve the time saving and labor saving objects. For example, the labor saving object can be achieved if the first arm 1121 and the second arm 1221 respectively are longer than the first transmission arm 1621 and the second transmission arm 1721, and the time saving object can be achieved if the first arm 1121 and the second air 1221 respectively are shorter than the first transmission arm 1621 and the second transmission arm 1721.

The first linkage unit 11, the second linkage unit 12 and the third linkage unit 15 can respectively be driven by the first drive unit 16, the second drive unit 17 and the third drive unit 18 according to the present invention to allow the first linkage unit 11, the second linkage unit 12 and the third linkage unit 15 to drive the driven unit 13 to move up and down or left and right and rotate relatively to the geometric center point O of the connection block 14. Therefore, the multi-degree-of-freedom motion mechanism 1 of the present invention has the action function of three degrees of freedom and the intersection of the axes L1, L2 and L3 at the same center point similar to an action function of clipping and picking up an article through a mechanical arm; it can conform to a requirement of obtaining a unique solution by a calculation of logic algorithm to allow the mechanical arm to complete the clipping and picking-up of the article autonomously.

The multi-degree-of-freedom motion mechanism 1 of the present invention may be applied to an action mechanism of a camera lens of a robot head, and may be applied to a joint mechanism such as a robot shoulder, elbow, wrist, knee or ankle, and may also be applied to an adapter connected to a searchlight, antenna, radar antenna or hub and used as a joint of a transmission box and a joint of a flying facility.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-degree-of-freedom motion mechanism comprising:
a first linkage unit disposed with a first curved projecting section, a U shaped first pivot section and a U-shaped second pivot section; wherein two ends of said first curved projecting section are respectively connected to said first pivot section and said second pivot section;
a first fixing shaft with a first axis being pivotally coupled to said first pivot section and an external article;
a second fixing shaft being pivotally coupled to said second pivot section and said external article, and commonly sharing with said first axis for said first curved projecting section rotating with respect to said first axis;
a second linkage unit being disposed with a second curved projecting section, a third pivot section and a fourth pivot section; wherein said second curved projecting section has two ends to connect with said third pivot section and said fourth pivot section respectively, is placed next to the inner side of said first curved projecting section and interlaced with said first curved projecting section;
a third fixing shaft pivotally coupled to said third pivot section;
a fourth fixing shaft pivotally coupled to said fourth pivot section, having a second axis commonly sharing with said third fixing shaft for said second curved projecting section capable of rotating with respect to said second axis;
a driven unit with a third axis being disposed with a driven rod and a U-shaped first pivot element with a closed end and two fork sides, wherein an end of said driven rod is connected to said closed end of said first pivot element, which is embraced by said first pivot element being placed inside said second curved projecting section, another end of said driven rod passes through and extends outward said first curved projecting section and said second curved projecting section respectively;
a cube-shaped connection block being pivotally coupled to said first pivot element via said fork sides, and having a geometric center point for said third axis pointing toward said geometric center point;
a third linkage unit being disposed with a U-shaped second pivot element with a second closed end and two second fork sides and a coupling element for said second pivot element being connected to said coupling element and being pivotally coupled to said connection block with said second fork sides;
wherein, said first linkage unit is capable of actuating said driven rod to move along with said second curved projecting section and rotate with respect to said first axis; said second linkage unit is capable of actuating said driven rod to move along said first curved projecting section and rotate with respect to said second axis for said driven unit moving up and down as well as left and right with respect to said geometric center point;
wherein said first pivot section is connected to a first drive unit for driving said first pivot section through said first drive unit and being available for said first curved projecting section to rotate with respect to said first axis;
wherein said third pivot section is connected to a second drive unit and driven with said second drive unit for said second curved projecting section capable of rotating with respect to said second axis;
wherein said coupling element is connected to a third drive unit and driven with said third drive unit such that said connection block and said first pivot element are actuated to rotate said driven rod with respect to said third axis;
wherein two opposite end faces of said connection block are respectively pivotally coupled to said first pivot element with two first pivotal shafts; said two first pivotal shafts, said third fixing shaft and said fourth fixing shaft commonly share with said second axis; other two opposite end faces of said connection block are respectively pivotally coupled to said second pivot element with two second pivotal shafts; said two second pivotal shafts, said first fixing shaft and said second fixing shaft commonly share with said first axis;
wherein said first pivot section is disposed with a first arm extended toward a lateral outer side of said first curved projecting section; said first drive unit is disposed with a first power source and a first transmission unit respectively; said first transmission unit is respectively connected to said first power source and said first arm for said first power source capable of driving said first arm through said first transmission unit;
wherein said first transmission unit is disposed with a first transmission arm and a first transmission rod; one end of said first transmission arm is connected to said first power source; two ends of said first transmission rod are pivotally coupled to said first arm and said first transmission arm respectively;

wherein said third pivot section is disposed with a second arm extended toward a lateral outer side of said second curved projecting section; said second drive unit is disposed with a second power source and a second transmission unit; said second transmission unit is respectively connected to said second power source and said second arm for said second power source capable of driving said second arm;

wherein said second transmission unit is disposed with a second transmission arm and a second transmission rod; one end of said second transmission arm is connected to said second power source; two ends of said second transmission rod are respectively pivotally coupled to said second arm and said second transmission arm;

wherein said third drive unit is disposed with a third power source and a third transmission unit; said transmission unit is respectively connected to said coupling element for said third power source capable of rotating said third transmission unit and further rotating said coupling element;

wherein said first power source, said second power source and said third power source are respectively fixedly coupled to a base;

wherein said first pivot section is a U-shaped body with two outer sides each having a first long outer side portion; said first fixing shaft is pivotally coupled to said first long outer side portion; said first transmission rod is pivotally coupled to an outer side of said first arm.

2. The multi-degree-of-freedom motion mechanism according to claim 1, wherein said third pivot section is a U-shaped body with two outer sides each having a third long outer side; said third fixing shaft is pivotally coupled to said third long outer side; said second transmission rod is pivotally coupled to an outer side of said second arm.

3. The multi-degree-of-freedom motion mechanism according to claim 2, wherein said second pivot section is a U-shaped body with two outer sides each having a second long outer side portion; said second fixing shaft is pivotally coupled to said second outer side portion.

4. The multi-degree-of-freedom motion mechanism according to claim 3, wherein said fourth pivot section is a U-shaped body with two outer sides each having a fourth long outer side portion; said fourth fixing shaft is pivotally coupled to said fourth long outer side portion.

* * * * *